United States Patent
Taboada et al.

(10) Patent No.: US 6,871,319 B2
(45) Date of Patent: Mar. 22, 2005

(54) TABLE STYLES INFERENCE ENGINE

(75) Inventors: Roberto C. Taboada, Bothell, WA (US); Robert Little, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 765 days.

(21) Appl. No.: 09/818,155

(22) Filed: Mar. 27, 2001

(65) Prior Publication Data

US 2002/0174143 A1 Nov. 21, 2002

(51) Int. Cl.$^7$ .............................................. G06F 17/24
(52) U.S. Cl. ..................................................... 715/509
(58) Field of Search ................................. 715/509, 510, 715/503, 504

(56) References Cited

U.S. PATENT DOCUMENTS 6,613,098 B1 * 9/2003 Sorge et al. ................. 715/503
6,691,281 B1 * 2/2004 Sorge et al. ................. 715/503

OTHER PUBLICATIONS

Camarda, Bill et al., Special Edition Using Microsoft Word 2000, Chapter 9—"Tables: Organizing Your Pages" (Que Publishin 1999).*

Microsoft Word 2000 (© 1999).*

*An approach toward binary quantization of color table images for document analysis*; Hong–Ming Suen and Jhing–Fa Wang; *Proceedings of ICICS, 1997 International Conference on Information, Communication and Signal Processing*, 1997, pp. 485–489 vol. 1.

*Using style sheets, templates and the features of publishing software to facilitate the development of printed study materials*; D. Kimber; *Educational and Training Technology International*, 1989, v26, No. 1, pp. 72–78.

*Tabular typography*; R.J. Beach; *Text Processing and Document Manipulation, Proceedings of the International Conference*, 1986, pp. 18–33.

* cited by examiner

Primary Examiner—Stephen S. Hong
Assistant Examiner—Doug Hutton
(74) Attorney, Agent, or Firm—Merchant & Gould

(57) ABSTRACT

A table styles inference engine determines the optimal body pattern to describe a user-created table. Optimal uniform, row banding, and column banding body patterns, are determined. The user-defined table is analyzed assuming different uniform different row banding, and/or different column banding body patterns. The optimal uniform body pattern is then determined by determining the uniform body pattern that most closely matches the user-defined table. The optimal row banding body pattern is then determined by determining the row banding body pattern that most closely matches the user-defined table. The optimal column banding body pattern is then determined by determining the column banding body pattern that most closely matches the user-defined table. From these optimal body patterns, the closest match to the user-defined table is determined to be the overall optimal body pattern. The overall optimal body pattern is then saved as a table style.

11 Claims, 11 Drawing Sheets

TABLE STYLES INFERENCE ENGINE

TECHNICAL FIELD

The invention generally relates to electronic documents, and more particularly relates to a table styles inference engine to determine the formatting attributes of an existing table so that the formatting attributes can be converted into a table style and applied to other tables.

BACKGROUND

Some word processing program modules, such as the "WORD 10" word processing program module marketed by Microsoft Corporation of Redmond, Wash., include the concept of a table style. A table style is a collection of formatting attributes that may be applied to a table. The formatting attributes may include borders, shading, indentation and alignment, among others. The user may select a table style from a list of standard table styles and apply the table style to a table.

Even though standard table styles are useful, they do not allow a user to create their own table style from manual formatting and apply that style to other tables. So, if a user wants a table formatted differently than a standard table style, the user must either create the custom table style (using a user interface) or create and format the table manually. Users do not mind manually formatting a table and they often do so. However, users become frustrated when they are unable to apply formatting from a table they have already created to another table and must repeatedly format a table the same way. Thus, one drawback of existing word processing program modules is that a user is not able to manually create and format a table and then automatically apply the formatting attributes to another table.

SUMMARY OF THE INVENTION

The present invention meets the above-described needs by providing a table styles inference engine. In one embodiment, the table styles inference engine is able to determine the formatting attributes of a user-defined table and create a table style from the formatting attributes.

In one aspect, to create a table style, the table styles inference engine determines the optimal body pattern to describe a user-created table. In order to achieve compatibility with existing table styles, an optimal uniform body pattern, an optimal row banding pattern and an optimal column banding pattern are determined. The user-defined table is analyzed assuming different uniform body patterns. The optimal uniform body pattern is then determined by determining the uniform body pattern that most closely matches the user-defined table. The user-defined table is also analyzed assuming different row banding body patterns. The optimal row banding body pattern is then determined by determining the row banding body pattern that most closely matches the user-defined table. The user-defined table is also analyzed assuming different column banding body patterns. The optimal column banding body pattern is then determined by determining the column banding body pattern that most closely matches the user-defined table. From these optimal body patterns, the closest match to the user-defined table is determined to be the overall optimal body pattern. The overall optimal body pattern is then saved as a table style.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "WORD 11" word processing program module marketed by Microsoft Corporation of Redmond, Wash. Briefly described, in one embodiment, the invention is a table styles inference engine that is able to determine the formatting attributes of an existing table in an electronic document and create a table style based on the formatting. The table style may then be used to apply the formatting attributes to other tables.

In one embodiment, the present invention solves the drawbacks of the prior art by extracting the formatting attributes of a table and converting them into a table style. For example, suppose a user manually formats a table with the first row having a purple background, the first column (excluding the top corner cell) having a gray background and having internal black horizontal borders. The user then inserts new tables and wants to format them in the same way.

The user certainly doesn't want to apply shading to the first row and first column of every new table. Using an embodiment of the present invention, the user is able to format any new tables just like the one previously created. The inference engine in accordance with an embodiment of the present invention can examine the table and create a table style whose description is as follows:

1. first row is purple;
2. first column is gray;
3. top, left corner has formatting match the first row; and
4. the table has internal black horizontal borders.

When the user wants another table to look like the table described above, the user simply needs to apply the style, instead of manually applying all the formatting to every portion of the table. The table style also has the benefit that the formatting is updated automatically as new rows and columns are added.

In a preferred embodiment, the present invention is compatible with the conditional formatting of the existing table styles feature of the "WORD 10" word processing program module. As described below under the Table Styles section, formatting attributes for a table style are not defined on a per cell basis, but instead are defined based upon portions of the table. For example, the left column may have different formatting attributes than the rest of the table. Thus, to achieve compatibility with existing table styles, in a preferred embodiment the present invention determines an optimal uniform body pattern, an optimal row banding pattern and an optimal column banding pattern. From these optimal patterns, the closest match to the user-defined table is found. The closest matching optimal pattern is then used as a table style.

Exemplary Operating Environment

Figure 1:
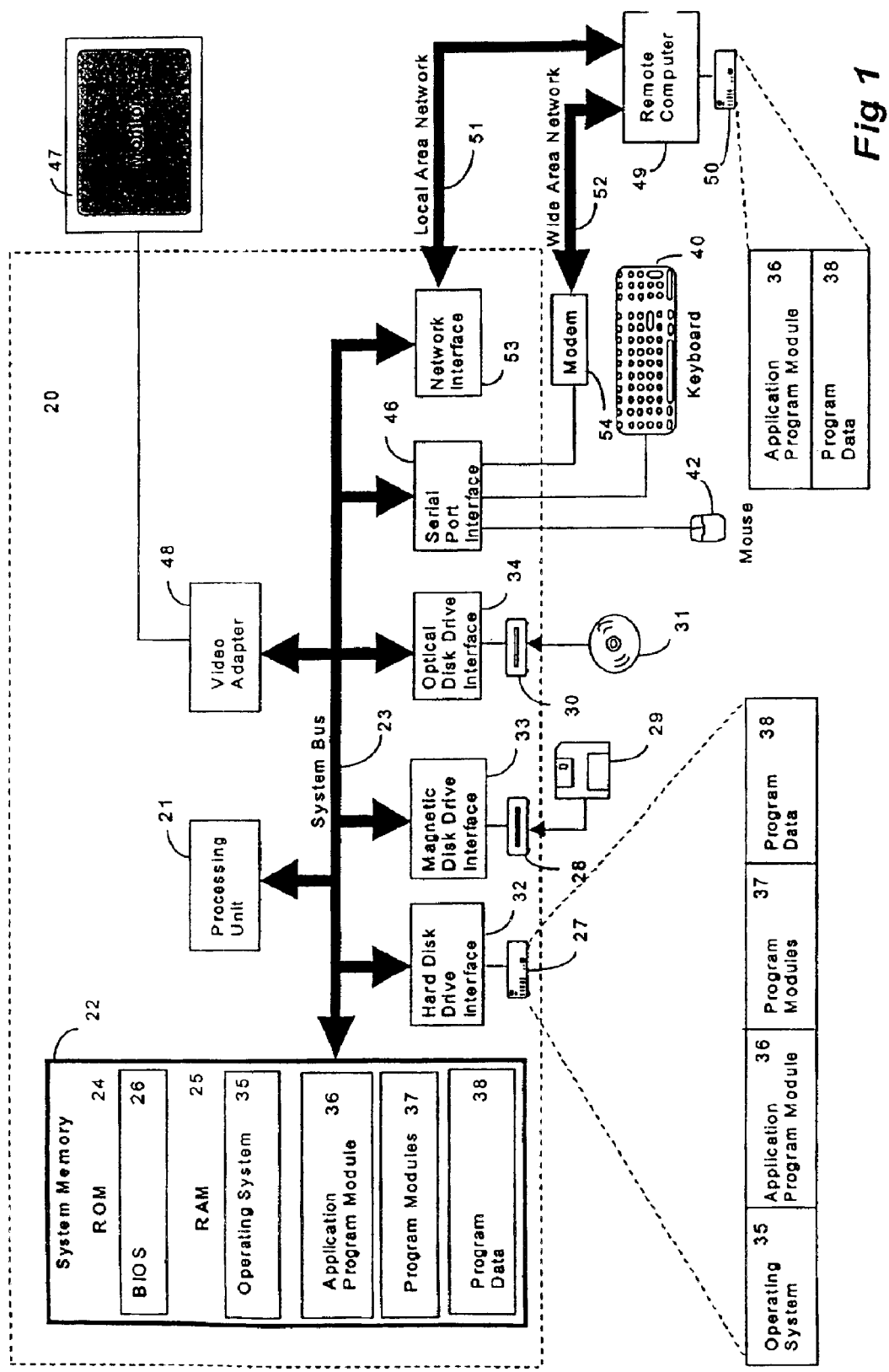
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program module 36, such as Microsoft's "WORD 11" word processing program module including a table styles inference engine, other program modules 37, and program data 38.

A user may enter commands and information into the personal computer 20 25 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Before describing different embodiments of the present invention, a brief description of table styles and definitions of terms will be provided below.

Table Styles

The "WORD 10" word processor program module, marketed by Microsoft Corporation of Redmond, Wash.

includes a feature known as table styles. A table style is a collection of formatting attributes that can be applied to a table and includes the ability to specify formatting attributes such as:
1. Borders and Shading;
2. Table Properties, such as indentation and alignment; and
3. Font and Paragraph properties for text inside the table.

One interesting thing about table styles is their ability to apply formatting conditionally, depending on the portion of the table. For example, the header row may have different formatting than the rest of the table. Table 1 lists the types of special cells, rows and columns within a table style which formatting attributes can be applied to independently:

TABLE 1

| Table section | Description |
| --- | --- |
| Whole table | Obvious |
| Header row | Obvious |
| Last row | Obvious |
| Left column | Obvious |
| Right column | Obvious |
| Odd row stripes | Each stripe can be comprised of an unlimited number of rows, but the number of rows in an odd row stripe must be the same as the number of rows in an even stripe. |
| Even row stripes | Each stripe can be comprised of an unlimited number of rows, but the number of rows in an odd row stripe must be the same as the number of rows in an even stripe. |
| Odd column stripes | Each stripe can be comprised of an unlimited number of columns, but the number of columns in an odd stripe must be the same as the number of columns in an even stripe. |
| Even column stripes | Each stripe can be comprised of an unlimited number of columns, but the number of columns in an odd stripe must be the same as the number of columns in an even stripe. |
| Top left cell | Obvious |
| Top right cell | Obvious |
| Bottom left cell | Obvious |
| Bottom right cell | Obvious |

Definitions of Terms

Table Style Properties: the formatting attributes that comprise a table style. Table 2 below lists the formatting attributes in a preferred embodiment of the present invention along with the portion of a table the formatting attributes may apply to (row, cell or text).

TABLE 2

| Borders | Row |
| --- | --- |
| Shading | Row |
| BottomPadding | Cell |
| FitText | Cell |
| LeftPadding | Cell |
| RightPadding | Cell |
| TopPadding | Cell |
| VerticalAlignment | Cell |
| WordWrap | Cell |
| Font properties applied to every character in a cell: Bold, Italics, Underline, Font type, Font size, Font color | Text |
| Paragraph properties applied to every paragraph in the cell | Text |

Majority Cell Style: the unique cell style (composed of table style properties) used most often in a column, row, or table.

Uniform body pattern: a pattern in which the body of a table (the whole table or the whole table minus one or more of the following: heading row, last row, first column, last column) has a single cell style throughout.

Row banding: a pattern in which the rows of a table have alternating shading/border/text styles.

Column banding: a pattern in which the columns of a table have alternating shading/border/text styles.

Odd cell for a column, row, or table: a cell that does not match the majority cell style of the row, column, or table.

Comparing two cells: reviewing the table styles properties listed above to determine whether two cells have the same cell style.

Determining a Table Style

The methods described in reference to FIGS. 2–11 are used to determine a table style for a table created by a user. The methods begin after the user has created a table and selected to use the table styles inference engine, such as by selecting it from a dropdown menu or selecting it from a toolbar. Of course, there may be other methods for selecting the table styles inference engine. Those skilled in the art will appreciate that the logic flow diagrams of FIGS. 2–11 are executed by the processing unit 21 (FIG. 1) in response to instructions that have been incorporated into the table styles inference engine.

The methods described in reference to FIGS. 2–11 are designed to determine the optimal pattern to describe the user-created table. In order to achieve compatibility with existing table styles, in a preferred embodiment, the present invention determines an optimal uniform body pattern, an optimal row banding pattern and an optimal column banding pattern. The user-defined table is analyzed assuming different uniform body patterns. The optimal uniform body pattern is then determined by determining the uniform body pattern that most closely matches the user-defined table.

The user-defined table is analyzed assuming different row banding body patterns. The optimal row banding body pattern is then determined by determining the row banding body pattern that most closely matches the user-defined table.

The user-defined table is analyzed assuming different column banding body patterns. The optimal column banding body pattern is then determined by determining the column banding body pattern that most closely matches the user-defined table.

From these optimal body patterns, the closest match to the user-defined table is determined to be the overall optimal body pattern. The overall optimal body pattern is then saved as a table style.

Analyzing the User-Defined Table Assuming Uniform Body Patterns

Figure 2:
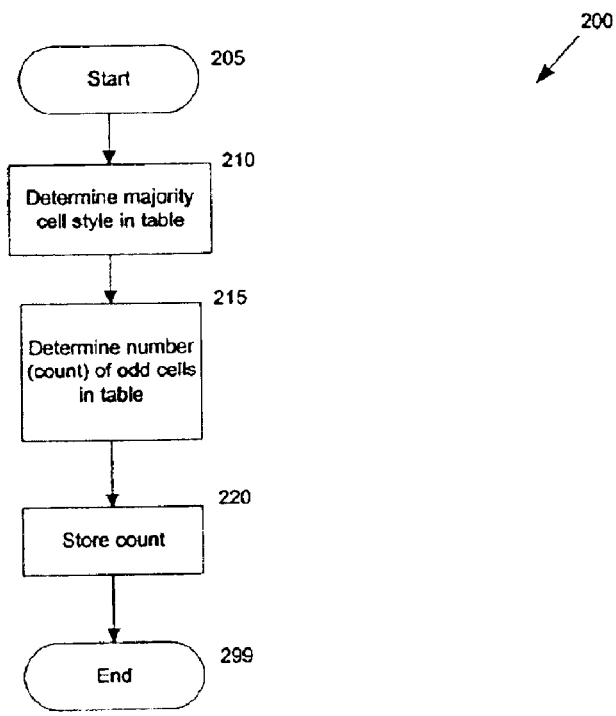
FIG. 2 is a logic flow diagram illustrating a method for analyzing a table assuming a uniform body pattern and no special rows or special columns in accordance with an embodiment of the present invention.
Figure 3:
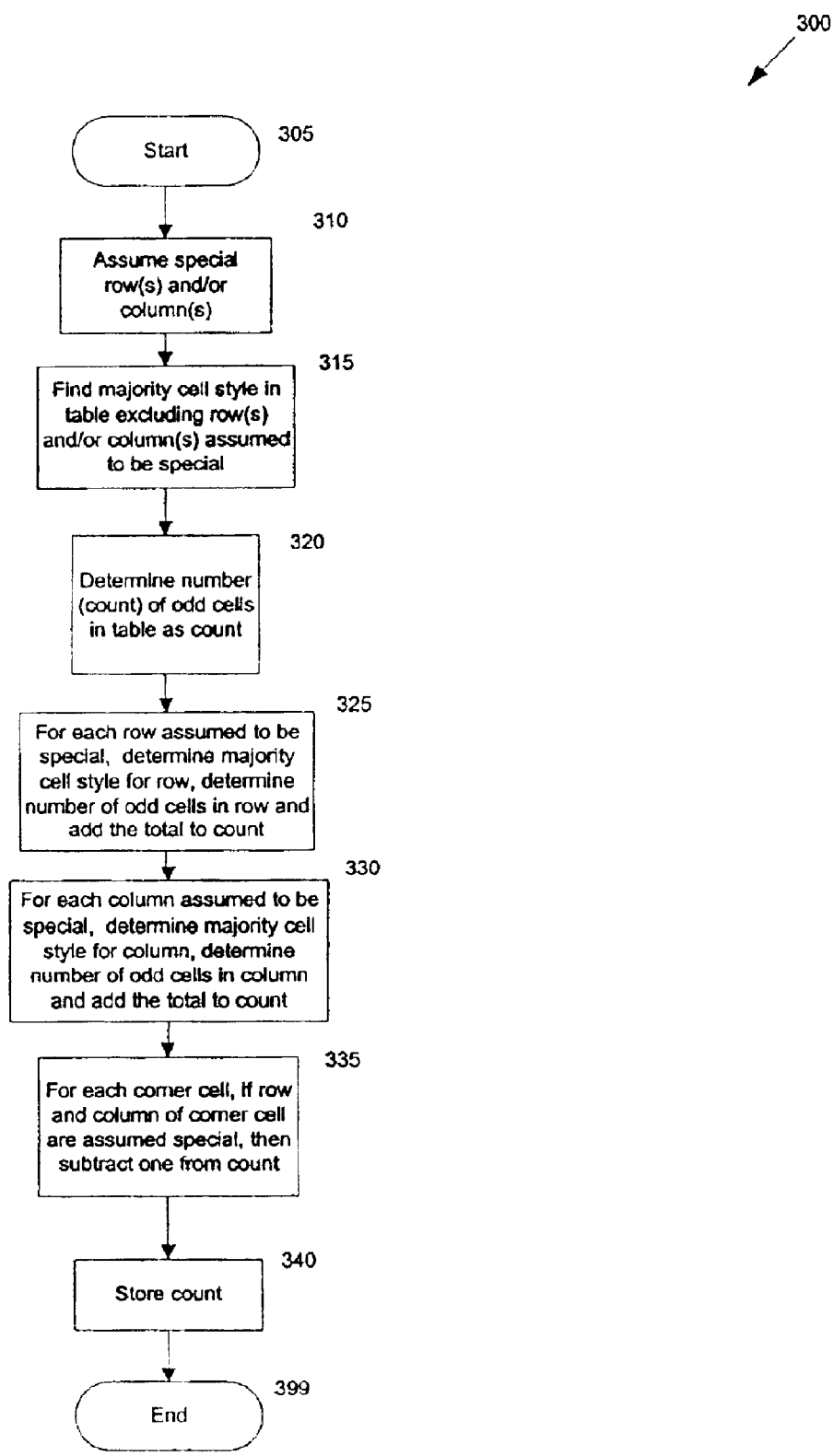
FIG. 3 is a logic flow diagram illustrating a method for analyzing a table assuming a uniform body pattern and assuming special rows and/or special columns in accordance with an embodiment of the present invention.
Figure 4:
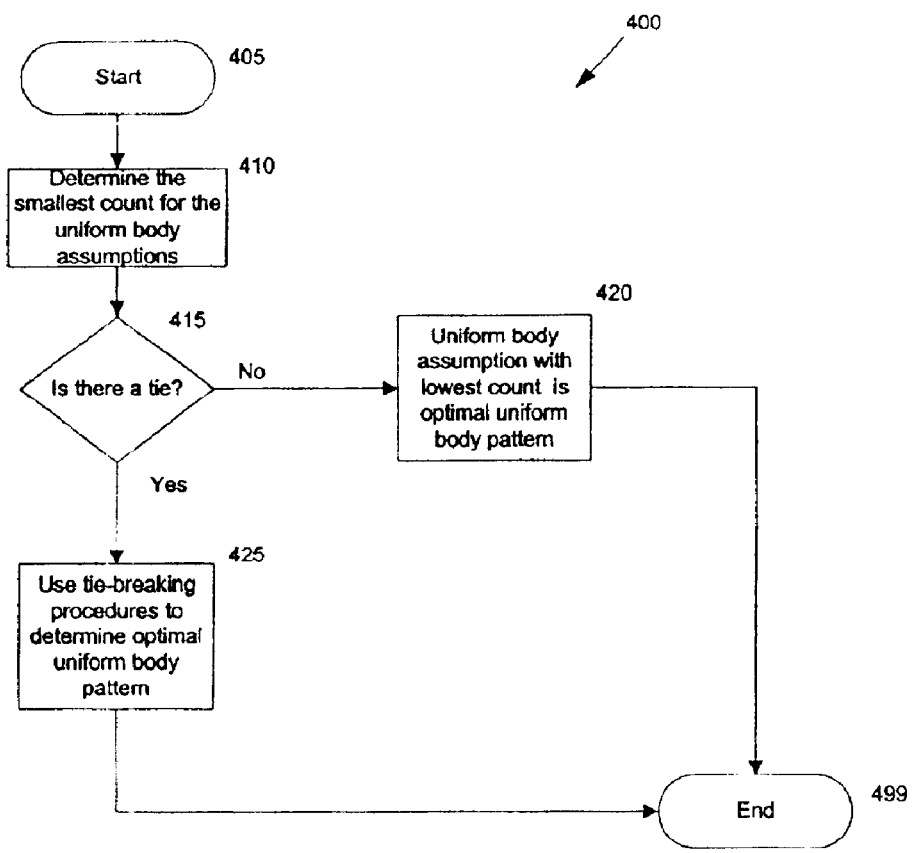
FIG. 4 is a logic flow diagram illustrating a method for determining the optimal uniform body pattern in accordance with an embodiment of the present invention.

Referring now to FIGS. 2–4, methods for analyzing a user-defined table assuming uniform body patterns will be described. The methods described in reference to FIGS. 2–4 are used to analyze the user-defined table assuming it has a uniform body pattern and no type of row or column banding. Different assumptions are made regarding the table (such as that it has no special rows and columns). Based on these assumptions, the user-defined table is analyzed and a score is generated for each assumption. The scores for the different uniform body assumptions are analyzed and the uniform body assumption with the lowest score is determined to be the optimal uniform body assumption.

Referring now to FIG. 2, a method 200 for analyzing a table assuming a uniform body pattern and no special rows or special columns will be described. The method 200 begins at start step 205 and proceeds to step 210 where the majority cell style of the table is determined. The majority cell style represents the cell style (composed of table style properties) most prevalent in the table. In case of a tie between two or more different cell styles, any of the tying cell styles may be selected as the majority cell style. The method then proceeds to step 215. At step 215, it is determined the number of odd cells in the table. Odd cells are those that do not match all of the table style properties of the majority cell style. The method then proceeds to step 220 where the number of odd cells is stored as the count for the uniform body pattern and no special rows or special columns assumption. The method ends at step 299.

Referring now to FIG. 3, a method 300 in accordance with an embodiment of the present invention for analyzing a table assuming a uniform body pattern and assuming special rows and/or special columns will be described. It should be understood that with special rows and/or columns, it is possible that the table has a special first and last row, and a special first and last column. Special means that the row or column is made up of cells with different table style properties than the majority cell style (the rest of the uniform body pattern). Therefore, each combination of special rows and/or columns is analyzed according to the method described in method 300 and a count is determined for each combination. For example, the assumption may comprise:

a uniform body pattern with a special first row;
a uniform body pattern with a special last row;
a uniform body pattern with a special first column;
a uniform body pattern with a special last column;
a uniform body pattern with a special first row and special last row;
a uniform body pattern with a special first row and special first column;
a uniform body pattern with a special first row and special last column;
a uniform body pattern with a special last row and special first column;
a uniform body pattern with a special last row and special last column;
a uniform body pattern with a special first column and special last column; etc. (a uniform body pattern with any combination of the following: special first row, special last row, special first column and special last column)

The method 300 begins at start step 305 and proceeds to step 310 where an assumption is made that certain row(s) and/or column(s) are special as described above. The method then proceeds to step 315. At step 315, the majority cell style for the table is determined, excluding cells in the rows and columns that were assumed to be special at step 310. The method then proceeds to step 320.

At step 320, the number (count) of odd cells in the table (those that do not match the table style properties of the majority cell style) is determined and saved as a count. Those cells that fall in any rows and columns assumed to be special are not counted. The method then proceeds to step 325.

At step 325, for each row assumed to be special, the majority cell style for the row is determined, the number of odd cells in the row (those not matching the majority cell style for the row) is determined, and the number of odd cells is added to count. The method then proceeds to step 330.

At step 330, for each column assumed to be special, the majority cell style for the column is determined, the number of odd cells in the column (those not matching the majority cell style for the column) is determined, and the number of odd cells is added to count. The method then proceeds to step 335.

At step 335, for each corner cell, if both the corner cell's row and column were assumed to be special, then subtract one from count. This is to avoid counting odd corner cells twice. The method then proceeds to step 340 where the value of count is stored for the particular uniform body assumption. The method ends at step 399.

It should be understood that, in a preferred embodiment, the steps of method 300 are repeated for each combination of special row(s) and/or column(s) with the following constraints:

1. Check for one special row if r>2
2. Check for one or two special rows if r>3
3. Check for one special column if c>2
4. Check for one or two special columns if c>3.

Where r is equal to the number of rows in the user-defined table and c is equal to the number of columns in the user-defined table.

Therefore, a count is determined and saved for each assumed uniform body pattern. These counts are compared to determine the optimal uniform body pattern as will be described below.

Determining the Optimal Uniform Body Pattern

Referring now to FIG. 4, a method 400 for determining the optimal uniform body pattern will be described. The method begins at start step 405 and proceeds to step 410 after a count has been determined for all of the uniform body pattern assumptions. At step 410, it is determined which uniform body assumption has the lowest count. A low count value means the uniform body assumption had the fewest cells that did not fit the assumed pattern. The method then proceeds to decision step 415.

At decision step 415, it is determined whether there is a tie for the lowest count between the counts of two or more uniform body assumptions. If not, then the method proceeds to step 420. At step 420, the uniform body assumption with the lowest count is the optimal uniform body pattern and the method ends at step 499. It should be understood that the optimal uniform body assumption will be compared with the optimal row banding assumption and the optimal column banding assumption as described in reference to FIG. 11.

If, at decision step 415, it is determined that there is a tie for the lowest count between the counts of two or more uniform body assumptions, then the method proceeds to step 425. At step 425, tie-breaking procedures are used to determine the optimal uniform body pattern.

In a preferred embodiment, at step 425, the tied uniform body assumption with the least number of special rows and special columns is selected as the optimal uniform body pattern. If a tie still persists, the tied uniform body assumption with the least number of special last rows and special last columns is selected as the optimal uniform body pattern. If a tie still persists, the tied uniform body assumption with the least number of special columns is selected as the optimal uniform body pattern.

The method then ends at step 499.

Analyzing Patterns Assuming Row Banding

Figure 5:
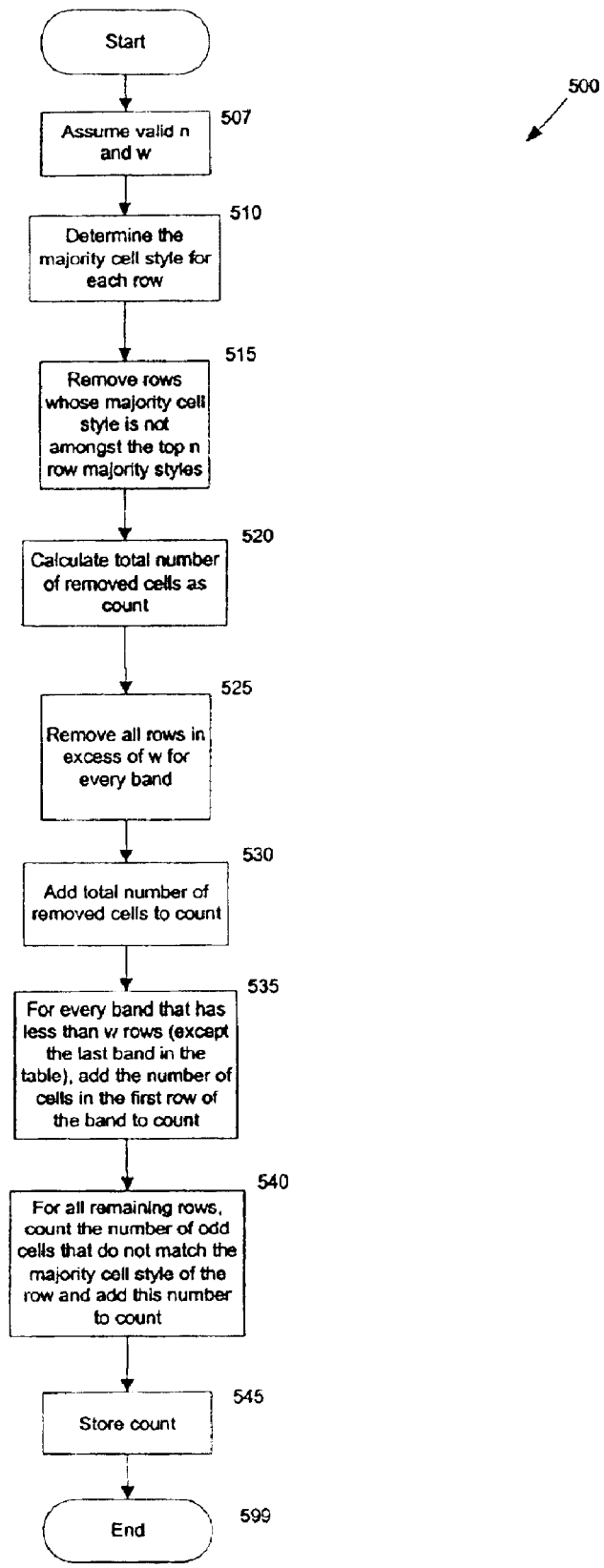
FIG. 5 is a logic flow diagram illustrating a method for analyzing a table assuming a row banding body pattern and no special columns in accordance with an embodiment of the present invention.
Figure 6:
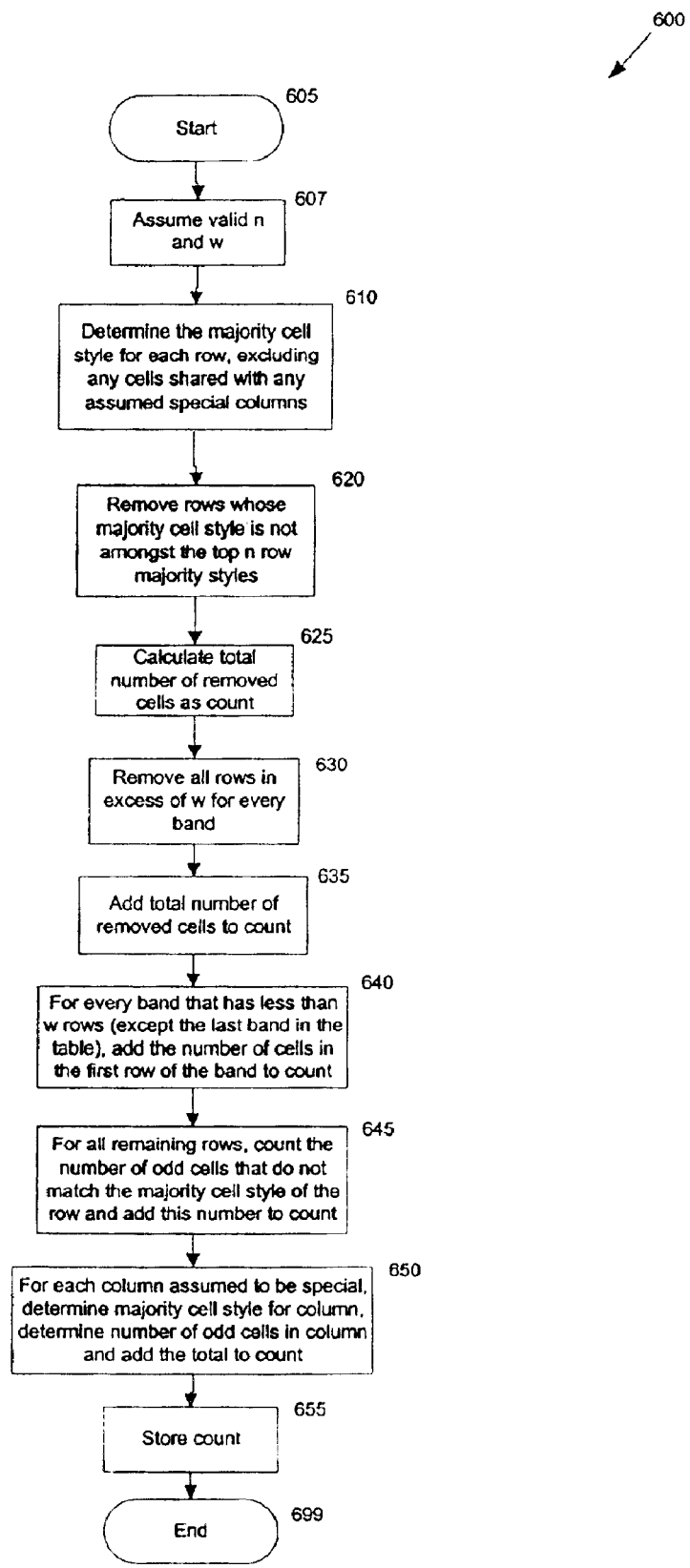
FIG. 6 is a logic flow diagram illustrating a method for analyzing a table assuming a row banding body pattern and assuming special columns in accordance with an embodiment of the present invention.
Figure 7:
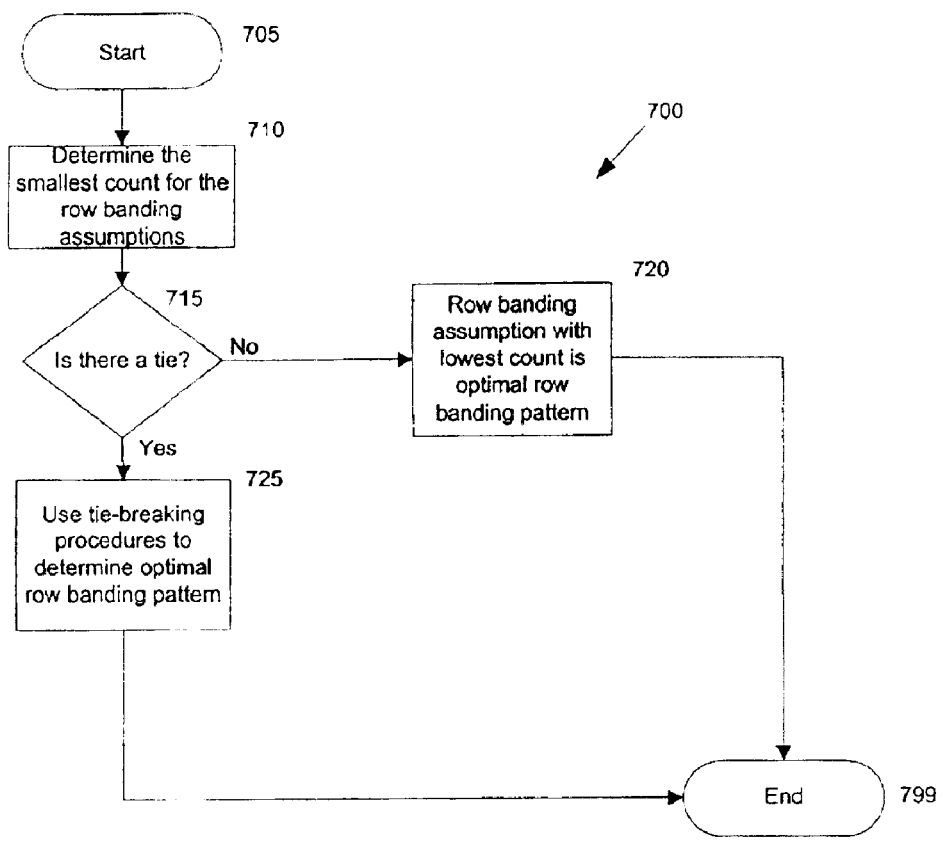
FIG. 7 is a logic flow diagram illustrating a method for determining the optimal row banding body pattern in accordance with an embodiment of the present invention.

Referring now to FIGS. 5–7, methods for analyzing a user-defined table assuming row banding patterns will be described. The methods described in reference to FIGS. 5–7 are used to analyze the user-defined table assuming it has a row banding pattern. Different assumptions are made regarding the table (such as that it has no special columns and assuming it has special columns). Based on these assumptions, the user-defined table is analyzed and a score is generated for each assumption. The scores for the different row banding assumptions are then analyzed and the row banding assumption with the lowest score is determined to be the optimal row banding pattern.

Referring now to FIGS. 5–7, a method for analyzing a selected table assuming a row banding body pattern will be described. The method 500 analyzes the table assuming it has a row banding body pattern and no special columns.

The methods of FIGS. 5–7 are used to find the row banding body pattern that most closely matches the body of the table. Banding patterns of n different repeating bands with w rows per band are used to attempt to match the pattern of the table, where n and w are defined in a preferred embodiment as:

1. n=2
2. 1<w<4
3. nw<=r, where r is equal to the number of rows in the user-defined table Thus, in a preferred embodiment, there can be no more than two bands, the bands can be at most 3 rows wide and an analysis is done only if at least one full pattern fits in the table. For every valid n and w, each of the methods described in FIGS. 5–6 are attempted.

Referring now to FIG. 5, a method 500 for analyzing a table assuming a row banding body pattern and no special columns will be described. The method 500 allows a table T' to be created by removing select rows out of the user-defined table T as will be described. The method 500 begins at start step 505 and proceeds to step 507 where a valid n and w are assumed. The method then proceeds to step 510 when the majority cell style for each row is determined. This style represents the cell style most prevalent in the row. In case of a tie between two styles, the most prevalent style in the table as a whole is selected. If there is still a tie, the style present in the leftmost cell (except the first cell) is selected. The method then proceeds to step 515.

At step 515, rows whose majority cell style is not amongst the top n row majority styles in the table are removed, with the exception of the first and last rows, which are considered to be special if they are not amongst the top n. The method then proceeds to step 520.

At step 520, the total number of cells removed at step 515 is saved as count. After the rows are removed at step 515, the table is composed of bands of the top n majority styles. The method then proceeds to step 525.

At step 525, all rows in excess of w for every band are removed. Removing these rows should make all remaining bands have width less than or equal to w as required. The method then proceeds to step 530.

At step 530, the total number of cells removed at step 525 is added to the count. The method then proceeds to step 535.

At step 535, for every band that has less than w rows, add the number of cells in the first row of the band to count (the last band in the table is excluded from this). The addition of step 535 is performed because having bands that are not of sufficient width takes away from the quality of the banding pattern. The method then proceeds to step 540.

At step 540, for each remaining row, determine the number of odd cells that do not match the majority style of the row and add this number to count. These cells also imply a lesser quality of banding and, thus, increase the count. The method then proceeds to step 545 where the value of count is stored for the corresponding row banding assumption. The method ends at step 599.

It should be understood that the method 500 is repeated for every valid value of n and w and a count is generated for each of the row banding assumptions.

Referring now to FIG. 6, a method 600 in accordance with an embodiment of the present invention for analyzing a table assuming a row banding body pattern and assuming special columns will be described. The method 600 allows a table T' to be created by removing select rows out of the selected table T as will be described.

The method 600 begins at start step 605 and proceeds to step 607 where a valid n and w are assumed. The method then proceeds to step 610 where the majority cell style for each row is determined (excluding any cells shared with any assumed special columns in the calculations). The method then proceeds to step 620.

At step 620, rows whose majority style is not amongst the top n row majority styles in the table are removed, with the exception of the first and last rows which are considered to be special if they are not amongst the top n. Removing rows at step 620 leaves bands of the top n majority styles. The method then proceeds to step 625.

At step 625, the total number of cells removed at step 620 is saved as the count. The method then proceeds to step 630.

At step 630, for each band, all rows in excess of w are removed. Removing the excess rows should make all bands have width less than or equal to w as required. The method then proceeds to step 635.

At step 635, the total number of cells removed at step 630 is added to the count. The method then proceeds to step 640.

At step 640, for every band (except the last band in the table) that has less than w rows, the number of cells in the first row of the band is added to the count. The addition performed in step 640 is because having bands that are not of sufficient width takes away from the quality of the banding. The method then proceeds to step 645.

At step 645, for each remaining row, determine the number of odd cells (excluding the cells in each row that belong to an assumed special column) that do not match the majority style of the row and add this number to the count. The method then proceeds to step 650.

At step 650, for each column that we assume to be special, determine the majority cell style for the column, determine the number of odd cells in the column, and add the total to the count. The method then proceeds to step 655 where the value of the count is stored for the assumed row banding assumption. The method ends at step 699.

It should be understood that, in a preferred embodiment, the steps described in method 600 are repeated for all numbers of special columns with the following constraints:

check for one special column if c>2; and check for one or two special columns if c>3, where c is equal to the number of rows in the user-defined table.

Determining the Optimal Row Banding Body Pattern

Referring now to FIG. 7, a method 700 for determining the optimal row banding pattern will be described. The method 700 determines whether the best row banding results are obtained using the assumption of no special columns, a first special column, a last special column, or two special columns. The count obtained in each of the row banding assumptions (for every valid n and w, assuming 0, 1, or 2 special columns) is examined to determine the lowest count.

The method begins at start step 705 and proceeds to step 710 where, for every row banding assumption analyzed in method 500 and method 600, it is determined which one has the lowest count at step 710. The lowest count value indicates that the row banding assumption had the fewest cells that did not fit the assumed pattern. The method then proceeds to decision step 715.

At decision step 715, it is determined whether there is a tie for the lowest count between the counts of two or more row banding assumptions. If not, the method proceeds to step 720. At step 720, the row banding assumption with the lowest count is the optimal row banding pattern and the method ends at step 799.

However, if, at decision step 715, it is determined that there is a tie, then the method proceeds to step 725. At step 725, of the tied row banding assumptions the following order of precedence (from preferred to least preferred) is used to determine the optimal row banding pattern: no special columns, a first special column, a last special column, or two special columns. The method 700 then ends at step 799.

Analyzing Patterns Assuming Column Banding

Figure 8:
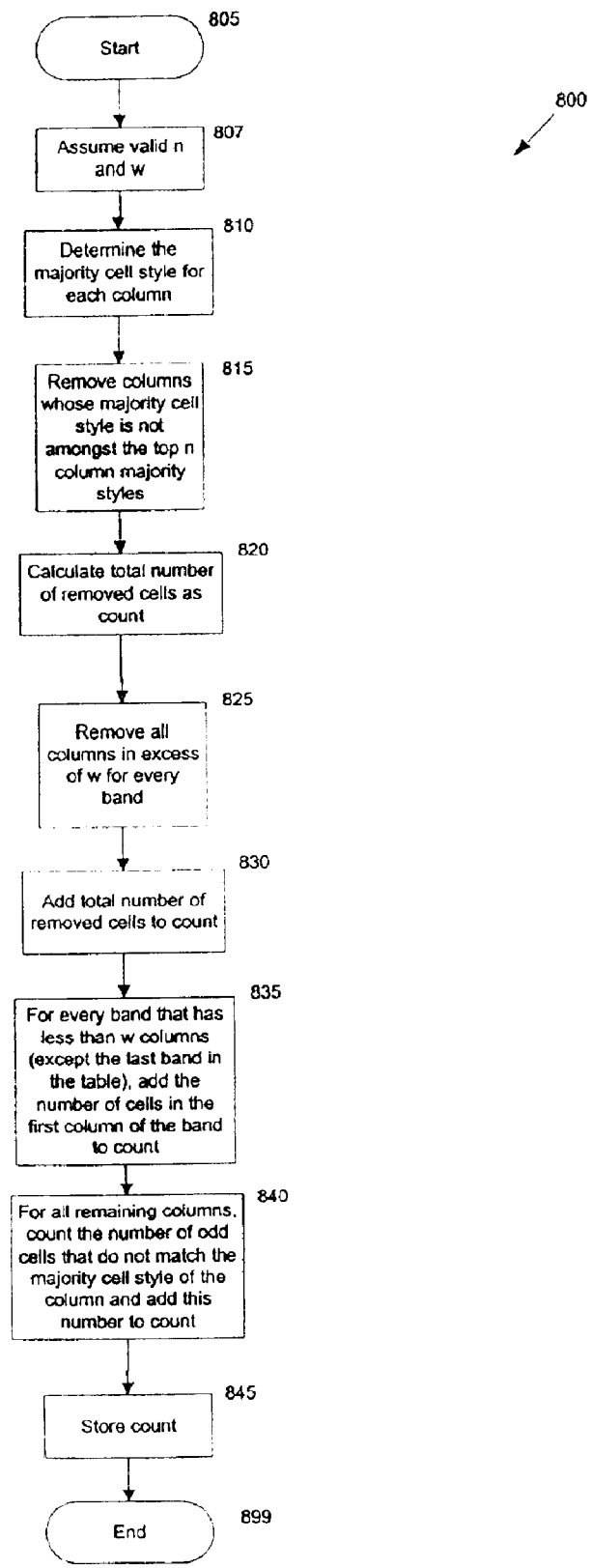
FIG. 8 is a logic flow diagram illustrating a method for analyzing a table assuming a column banding body pattern and no special rows in accordance with an embodiment of the present invention.
Figure 9:
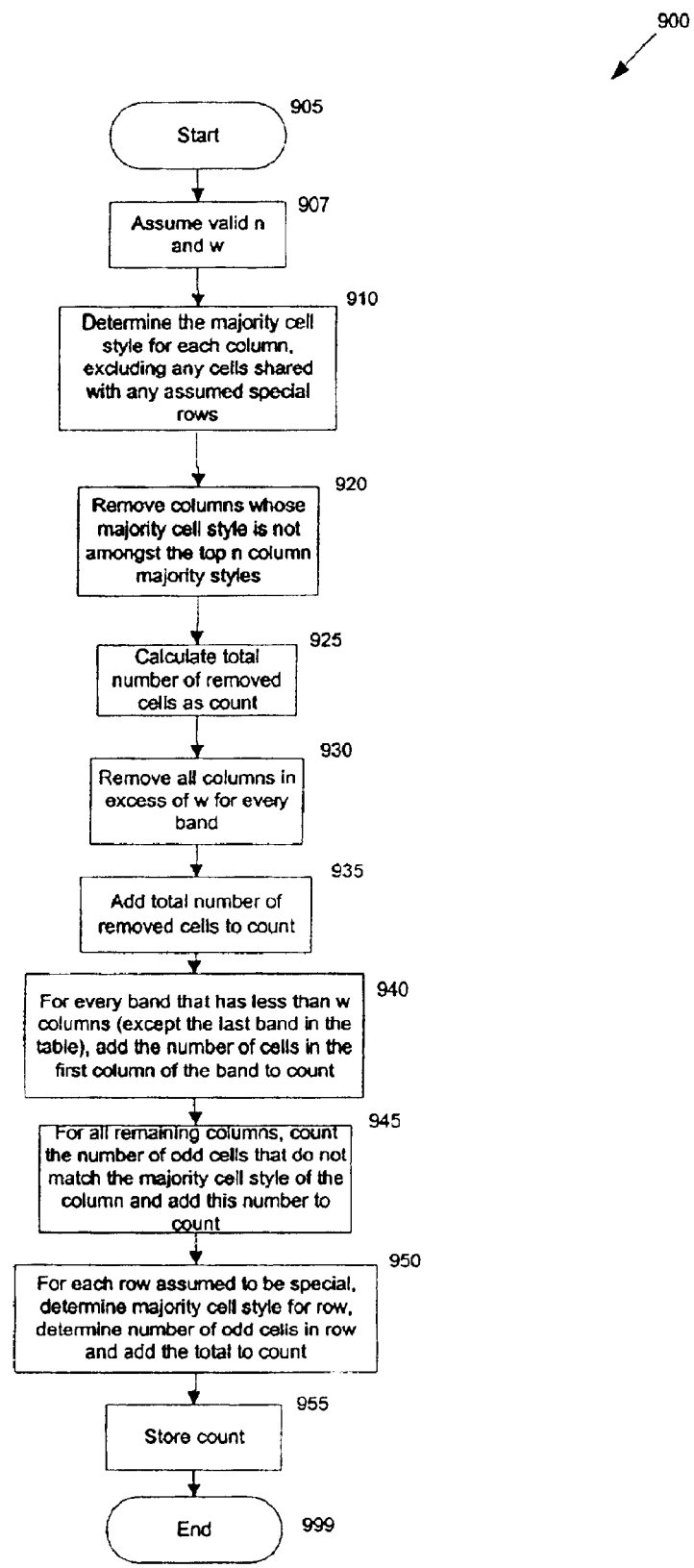
FIG. 9 is a logic flow diagram illustrating a method for analyzing a table assuming a column banding body pattern and assuming special rows in accordance with an embodiment of the present invention.
Figure 10:
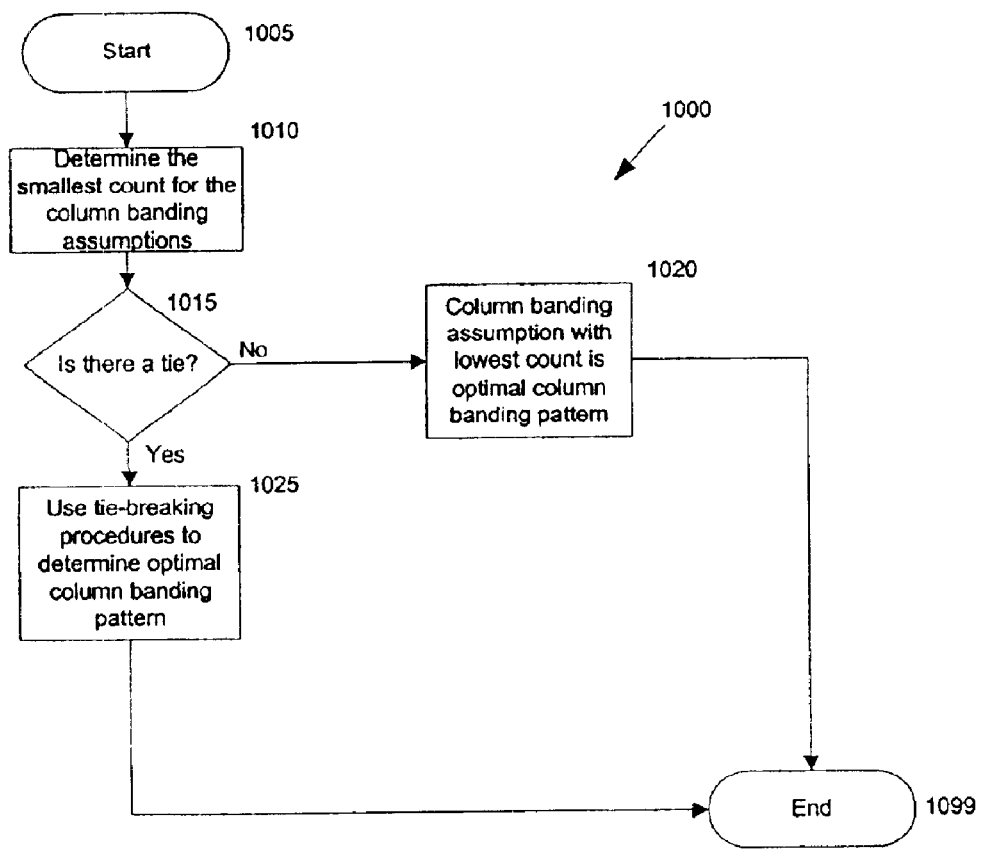
FIG. 10 is a logic flow diagram illustrating a method for determining the optimal column banding body pattern in accordance with an embodiment of the present invention.
Figure 11:
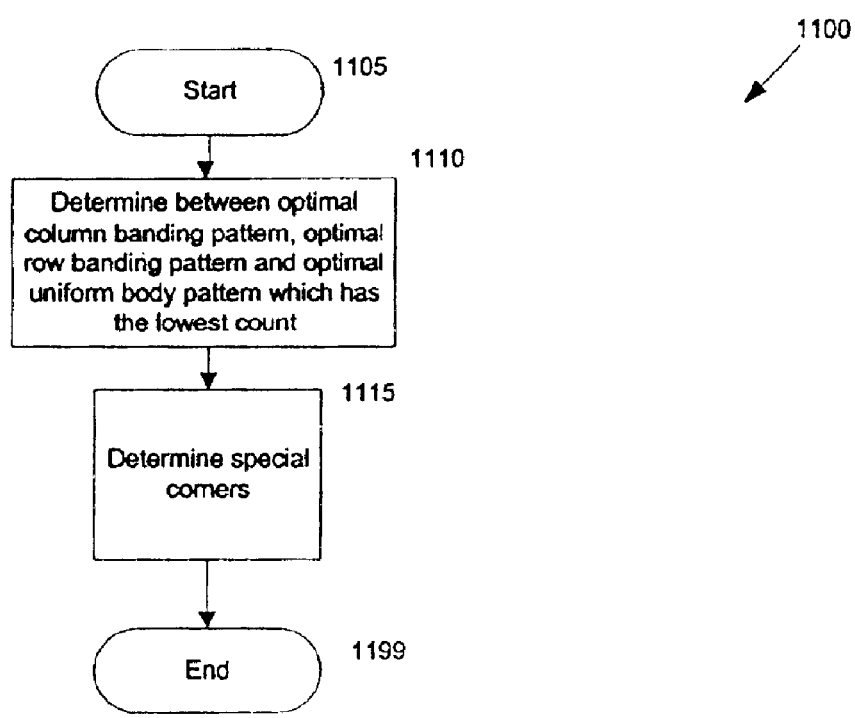
FIG. 11 is a logic flow diagram illustrating a method for determining the optimal table pattern in accordance with an embodiment of the present invention.

Referring now to FIGS. 8–10, methods for analyzing a user-defined table assuming column banding patterns will be described. The methods described in reference to FIGS. 8–10 are used to analyze the user-defined table assuming it has a column banding pattern. Different assumptions are made regarding the table (such as that it has no special rows and assuming it has special rows). Based on these assumptions, the user-defined table is analyzed and a score is generated for each assumption. The scores for the different column banding assumptions are then analyzed and the column banding assumption with the lowest score is determined to be the optimal column banding pattern.

Referring now to FIGS. 8–10, a method for analyzing a selected table assuming a column banding pattern will be described. The method 800 analyzes the table assuming it has a column banding pattern and no special rows.

The methods of FIGS. 8–10 are used to find the column banding pattern that most closely matches the body of the user-defined table. Banding patterns of n different repeating bands with w columns per band are used to attempt to match the pattern of the table, where n and w are defined in a preferred embodiment as:

n=2;

1<w<4; and nw<=c, where c is equal to the number of columns in the user-defined table Thus, in a preferred embodiment, there can be no more than two bands, the bands can be at most 3 columns wide and an analysis is done only if at least one full pattern fits in the table. For every valid n and w, each of the methods described in FIGS. 8–9 is attempted.

Referring now to FIG. 8, a method 800 in accordance with an embodiment of the present invention for analyzing a table assuming a column banding pattern and no special rows will be described. The method 800 allows a table T' to be created by removing select columns out of the selected table T as will be described. The method 800 begins at start step 805 and proceeds to step 807 where a valid n and w are assumed. The method then proceeds to step 810 where the majority cell style for each column is determined. This style represents the cell style most prevalent in the column. In case of a tie between two styles, the most prevalent style in the table as a whole is selected. If there is still a tie, the style present in the uppermost cell (except the first cell) is selected. The method then proceeds to step 815.

At step 815, columns whose majority cell style is not amongst the top n column majority styles in the table are removed, with the exception of the first and last columns, which are considered to be special if they are not amongst the top n. Removing the columns at step 815 leaves the bands of the top n majority styles. The method then proceeds to step 820.

At step 820, the total number of cells removed at step 815 is saved as the count. The method then proceeds to step 825.

At step 825, all columns in excess of w for every band are removed. The method then proceeds to step 830.

At step 830, the total number of cells removed at step 825 is added to the count. This should make all bands have width less than or equal to w as required. The method then proceeds to step 835.

At step 835, for every band that has less than w columns, the number of cells in the first column of the band is added to the count (the last band in the table is excluded from this). The addition of step 835 is performed because having bands that are not of sufficient width takes away from the quality of the banding. The method then proceeds to step 840.

At step 840, for all remaining columns, the number of odd cells that do not match the majority style of the column is determined and added to the count. These cells imply a lesser quality of banding and, thus, increase the value of the count. The method then proceeds to step 845 where the count is stored. The method ends at step 899.

It should be understood that the method 800 is repeated for every valid value of n and w and a count is generated for each of the column banding assumptions.

Referring now to FIG. 9, a method 900 in accordance with an embodiment of the present invention for analyzing a table assuming a column banding body pattern and assuming special rows will be described. The method 900 allows a table T' to be created by removing select columns out of the selected table T as will be described.

The method 900 begins at start step 905 and proceeds to step 907 where a valid n and w are assumed. The method then proceeds to step 910 where the majority cell style for each column is determined (excluding any cells shared with any assumed special rows in the calculations). The method then proceeds to step 920.

At step 920, columns whose majority style is not amongst the top n column majority styles in the table are removed, with the exception of the first and last columns which are considered to be special if they are not amongst the top n. Removing the cells at step 920 leaves bands of the top n majority styles. The method then proceeds to step 925.

At step 925, the total number of cells removed at step 920 is saved as the count. The method then proceeds to step 930.

At step 930, for every band, all columns in excess of w are removed. This should make all bands have width less than or equal to w as required. The method then proceeds to step 935.

At step 935, the total number of cells removed at step 930 is added to the count. The method then proceeds to step 940.

At step 940, for every band (except the last band in the table) that has less than w columns, the number of cells in the first column of the band is added to the count. The addition performed in step 940 is because having bands that are not of sufficient width takes away from the quality of the banding. The method then proceeds to step 945.

At step 945, for all remaining columns, the number of odd cells (excluding the cells in each column that belong to an assumed special row) that do not match the majority style of the column is determined and added to the count. The method then proceeds to step 950.

At step 950, for each row assumed to be special, the majority cell style for the row is determined, the number of odd cells in the row is determined, and the total is added to the count. The method then proceeds to step 955 where the count is stored. The method ends at step 999.

It should be understood that, in a preferred embodiment, the steps described in method 900 are repeated for all numbers of special rows with the following constraints:

check for one special row if r>2; and check for one or two special rows if r>3, where r is equal to the number of rows in the user-defined table.

Determining the Optimal Column Banding Body Pattern

Referring now to FIG. 10, a method 1000 for determining the optimal column banding pattern will be described. The method 1000 determines whether the best column banding results are obtained when we assume no special rows, a first special row, a last special row, or two special rows. The count obtained in each of the cases (for every valid n and w, assuming 0, 1, or 2 special rows) is examined to determine the lowest count.

The method begins at start step 1005 and proceeds to step 1010 where, for every column banding assumption analyzed in method 800 and method 900, it is determined which one has the lowest count. The lowest count value indicates that the column banding assumption had the fewest cells that did not fit the assumed pattern. The method then proceeds to decision step 1015.

At decision step 1015, it is determined whether there was a tie between two or more column banding patterns for the lowest count. If not, the method proceeds to step 1020. At step 1020, the column banding body assumption with the lowest count is the optimal column banding body pattern and the method ends at step 1099.

However, if, at decision step 1015, it is determined that there is a tie between two or more column banding patterns, then the method proceeds to step 1025. At step 1025, of the tied column banding patterns, the following order of precedence (from preferred to least preferred) is used to determine the optimal column banding pattern: no special rows, a first special row, a last special row, or two special rows. The method 1000 then ends at step 1099.

Determining Overall Optimal Pattern

After determining an optimal uniform body pattern, an optimal row banding pattern and an optimal column banding pattern, a method 1100 for determining the optimal table pattern is performed. The method 1100 begins at start step 1105 and proceeds to step 1110 where the values of the count determined for the optimal column banding pattern, optimal row banding pattern, and optimal uniform body pattern are compared and the pattern with the lowest count is determined. The pattern with the lowest count is the optimal pattern. If there is a tie between two or more patterns, the optimal pattern is selected in the following order of precedence: optimal uniform body pattern, optimal row banding pattern, and optimal column banding pattern. The method then proceeds to step 1115.

At step 1115, it is determined whether the optimal pattern determined at step 1110 has special corner cells. A corner cell is special if:

its row and column are special; and
its cell style does not match the majority cell style of its row; and
its cell style does not match the majority cell style of its column.

After step 1115, the best possible pattern for the table has been determined and the method ends at step 1199.

It should be understood that after a best possible pattern has been determined, then that is by definition the table style for the table. A style comprises:

cell style for cells of the whole table;
cell style for any row bands;
cell style for any column bands;
cell style for cells of any special rows;
cell style for cells of any special columns; and
cell style for special cells.

The best possible pattern determines all of these cell styles so the best possible pattern is stored as the table style.

It should be understood that the foregoing pertains only to the preferred embodiments of the present invention, and that numerous changes may be made to the embodiments described herein without departing from the spirit and scope of the invention.

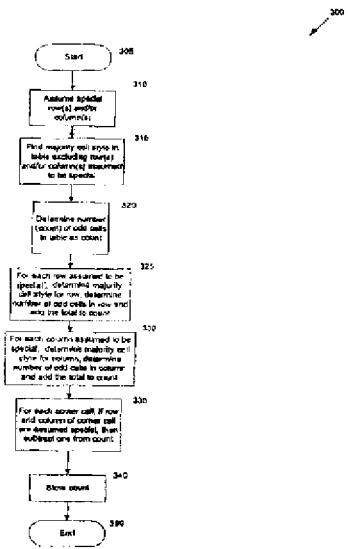

We claim:

1. A computer-implemented method for determining an optimal uniform body pattern for a table in an electronic document, wherein the table comprises a plurality of rows and a plurality of columns, the method comprising the steps of:

determining a majority cell style for the table;
   determining the number of odd cells in the table, wherein an odd cell comprises a cell that does not match the majority cell style;
   saving the number of odd cells as a first count;
   assuming a special row and/or column, wherein a special row or column comprises a row or column comprising cells with cell styles not matching the majority cell style, determining the following:
   (a) determining a majority cell style for the table excluding cells in the rows and/or columns that are assumed special;
   (b) determining the number of odd cells in the table excluding cells in the rows and/or columns assumed to be special, wherein an odd cell comprises a cell that does not match the majority cell style, and saving the number of odd cells as a second count;
   (c) for each row assumed to be special, determining a row majority cell style, determining a number of odd cells in the special row and adding the number to the second count;
   (d) for each column assumed to be special, determining a column majority cell style, determining a number of odd cells in the special column and adding the number to the second count;
   (e) for each corner cell, determining whether the row and column of the corner cell were both assumed to be special and, if so, then subtracting one from the second count;
   (f) saving the second count in association with an indication of the assumed special row and/or column;
   (g) repeating steps (a)–(f) for each combination of special row and/or column and determining which assumption has the lowest second count; and
   determining between the first count and second count which is lowest and saving the assumed body pattern associated with the lowest count as the optimal uniform body pattern for the table.

2. The method of claim 1 wherein the majority cell style is the cell style most prevalent in the table.

3. The method of claim 1 wherein the majority cell style comprises a plurality of table style properties.

4. The method of claim 3 wherein the plurality of table style properties comprises row borders, row shading, cell bottom padding, cell fit text, cell left padding, cell right padding, cell top padding, cell vertical alignment, cell wordwrap, text font properties and text paragraph properties.

5. The method of claim wherein the optimal uniform body pattern is saved as a table style.

6. The method of claim 5 wherein the table style comprises a plurality of cell styles.

7. A computer-implemented method for analyzing a table assuming a row banding body pattern and no special columns, wherein the table comprises a plurality of rows and a plurality of columns, the method comprising the steps of:

(a) assuming a valid n and a valid w, wherein a is the number of different repeating row bands and w is the number of rows per row band and wherein the product of n and w is less than or equal to the number of rows in the table;
   (b) determining a majority cell style for each row;
   (c) removing all rows, except the first and last row in the table, whose majority cell style is not among the most common n majority cell styles in the table;

(d) saving the total number of removed cells as a count for the assumed n and w;

(e) removing all rows in excess of w for every band and adding the total number of removed cells to the count;

(f) for every band with less than w rows, except the last band in the table, adding the number of cells in the first row of the band to the count;

(g) for all remaining rows, determining the number of odd cells not matching the majority cell style for the row and adding the number to the count;

(h) storing the count for the assumed n and w in association with the assumed row banding body pattern; and (i) repeating steps (a)–(h) for every valid n and w.

8. The method of claim 7 further comprising the steps of comparing the plurality of counts and storing the assumed row banding body pattern associated with the lowest count as the optimal row banding body pattern with no special columns.

9. A computer-implemented method for analyzing a table assuming a row banding body pattern and assuming special columns, wherein the table comprises a plurality of rows and a plurality of columns, the method comprising the steps of:

(a) assuming a valid n and a valid w, wherein n is the number of different repeating row bands and w is the number of rows per row band and wherein the product of n and w is less than or equal to the number of rows in the table;

(b) determining a majority cell style for each row excluding any cells shared with any assumed special columns;

(c) removing any rows whose majority cell style is not among the most common n row majority cell styles;

(d) saving the total number of removed cells as a count for the assumed n and w;

(e) removing all rows in excess of w for every band and adding the total number of removed cells to the count;

(f) for every band with less than w rows, except the last band in the table, adding the number of cells in the first row of the band to the count;

(g) for all remaining rows, determining the number of odd cells not matching the majority cell style for the row and adding the number to the count;

(h) for each column assumed to be special, determine the majority cell style for the column, determine the number of odd cells in the column and add the total to the count;

(i) storing the count for the assumed n and w; and (j) repeating steps (a)–(i) for every valid n and w.

10. A computer-implemented method for analyzing a table assuming a column banding body pattern and no special rows, wherein the table comprises a plurality of rows and a plurality of columns, the method comprising the steps of:

(a) assuming a valid n and a valid w, wherein n is the number of different repeating column bands and w is the number of columns per column band and wherein the product of n and w is less than or equal to the number of columns in the table;

(b) determining a majority cell style for each column;

(c) removing all columns, except the first and last column in the table, whose majority cell style is not among the most common n majority cell styles in the table;

(d) saving the total number of removed cells as a count for the assumed n and (e) removing all columns in excess of w for every band and adding the total number of removed cells to the count;

(f) for every band with less than w columns, except the last band in the table, adding the number of cells in the first column of the band to the count;

(g) for all remaining columns, determining the number of odd cells not matching the majority cell style for the column and adding the number to the count;

(h) storing the count for the assumed n and w; and (i) repeating steps (a)–(h) for every valid n and w.

11. A computer-implemented method for analyzing a table assuming a column banding body pattern and assuming special rows, wherein the table comprises a plurality of rows and a plurality of columns, the method comprising the steps of:

(a) assuming a valid n and a valid w, wherein n is the number of different repeating column bands and w is the number of columns per column band and wherein the product of n and w is less than or equal to the number of columns in the table;

(b) determining a majority cell style for each column excluding any cells shared with any assumed special rows;

(c) removing any columns whose majority cell style is not among the most common n column majority cell styles;

(d) saving the total number of removed cells as a count for the assumed n and w;

(e) removing all columns in excess of w for every band and adding the total number of removed cells to the count;

(f) for every band with less than w columns, except the last band in the table, adding the number of cells in the first row of the band to the count;

(g) for all remaining columns, determining the number of odd cells not matching the majority cell style for the column and adding the number to the count;

(h) for each row assumed to be special, determine the majority cell style for the row and determine the number of odd cells in the row and add the total to the count;

(i) storing the count for the assumed n and w; and (j) repeating steps (a)–(i) for every valid n and w.

* * * * *

UNITED STATES PATENT AND TRADEMARK OFFICE
CERTIFICATE OF CORRECTION

| | |
|---|---|
| PATENT NO. | : 6,871,319 B2 |
| APPLICATION NO. | : 09/818155 |
| DATED | : March 22, 2005 |
| INVENTOR(S) | : Taboada et al. |

It is certified that error appears in the above-identified patent and that said Letters Patent is hereby corrected as shown below:

The title page showing the illustrative figure should be deleted to be replaced with the attached title page.

On the title page, item (57), in "Abstract", in column 2, line 3, after "patterns" delete ",".

On the title page, item (57), in "Abstract", in column 2, line 5, after "uniform" insert -- , --.

On Sheet 1 of 11, in Fig. 1 (Box 34), line 1, delete "Optlcal" and insert -- Optical --, therefor.

On Sheet 3 of 11, in Fig. 3 (Box 325), line 2, Delete "speclal" and insert -- special --, therefor.

In column 4, line 23, after "computer 20" delete "25".

In column 7, line 39, after "last column)" insert -- . --.

In column 9, line 10, after "table" insert -- . --.

In column 14, line 51, in Claim 5, after "claim" insert -- 6 --.

In column 14, line 59, in Claim 7, after "wherein" delete "a" and insert -- n --, therefor. (Third occurrence)

In column 16, line 10, in Claim 10, after "assumed n and" insert -- w; --.

Signed and Sealed this

Seventh Day of April, 2009

JOHN DOLL
*Acting Director of the United States Patent and Trademark Office*

United States Patent
Taboada et al.

(10) Patent No.: US 6,871,319 B2
(45) Date of Patent: Mar. 22, 2005

(54) TABLE STYLES INFERENCE ENGINE

(75) Inventors: Roberto C. Taboada, Bothell, WA (US); Robert Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 09/818,155

(22) Filed: Mar. 27, 2001

(65) Prior Publication Data

US 2002/0174143 A1 Nov. 21, 2002

(51) Int. Cl. ............................................. G06F 17/24
(52) U.S. Cl. ........................................................ 715/509
(58) Field of Search ................................. 715/509, 510, 715/503, 504

(56) References Cited

U.S. PATENT DOCUMENTS 6,613,098 B1 * 9/2003 Sorge et al. ................ 715/503
6,691,281 B1 * 2/2004 Sorge et al. ................ 715/503

OTHER PUBLICATIONS

Camarda, Bill et al., Special Edition Using Microsoft Word 2000, Chapter 9—"Tables: Organizing Your Pages" (Que Publishin 1999).*
Microsoft Word 2000 (© 1999).*
*An approach toward binary quantization of color table images for document analysis*; Hong–Ming Suen and Jhing–Fa Wang; *Proceedings of ICICS, 1997 International Conference on Information, Communication and Signal Processing*, 1997, pp. 485–489 vol. 1.

*Using style sheets, templates and the features of publishing software to facilitate the development of printed study materials*; D. Kimber; *Educational and Training Technology International*, 1989, v26, No. 1, pp. 72–78.

*Tabular typography*; R.J. Beach; *Text Processing and Document Manipulation, Proceedings of the International Conference*, 1986, pp. 18–33.

* cited by examiner

*Primary Examiner*—Stephen S. Hong
*Assistant Examiner*—Doug Hutton
(74) *Attorney, Agent, or Firm*—Merchant & Gould

(57) ABSTRACT

A table styles inference engine determines the optimal body pattern to describe a user-created table. Optimal uniform, row banding, and column banding body patterns, are determined. The user-defined table is analyzed assuming different uniform different row banding, and/or different column banding body patterns. The optimal uniform body pattern is then determined by determining the uniform body pattern that most closely matches the user-defined table. The optimal row banding body pattern is then determined by determining the row banding body pattern that most closely matches the user-defined table. The optimal column banding body pattern is then determined by determining the column banding body pattern that most closely matches the user-defined table. From these optimal body patterns, the closest match to the user-defined table is determined to be the overall optimal body pattern. The overall optimal body pattern is then saved as a table style.

11 Claims, 11 Drawing Sheets